July 21, 1931. E. J. GULICK 1,815,733
PISTON
Filed Nov. 30, 1917

Inventor:
Edward J. Gulick,
By Milton Tibbetts, Atty

Patented July 21, 1931

1,815,733

UNITED STATES PATENT OFFICE

EDWARD J. GULICK, OF ELKHART, INDIANA, ASSIGNOR, BY MESNE ASSIGNMENTS, TO THE CLEVELAND TRUST COMPANY, A CORPORATION OF OHIO

PISTON

Application filed November 30, 1917. Serial No. 204,661.

This invention relates to pistons.

One of the objects of the present invention is to provide a piston which will not expand against the cylinder wall to such an extent as to seize or stick.

Another object of the invention is to provide a piston with a skirt or guide portion slightly separated from the head of the piston and split longitudinally so that it will not expand in circumference with a force great enough to cause the piston to stick in the cylinder.

Another object of the invention is to provide a piston with improved lubricating means for the piston pin bosses.

Another object of the invention is to rigidly support the piston pin bosses of a piston from the piston walls against mechanical load thrust from the connecting rod without interfering with the yielding characteristics of the skirt in response to cylinder wall pressure.

Other objects of the invention will appear from the following description taken in connection with the drawings which form a part of this specification, and in which.

Figure 1:
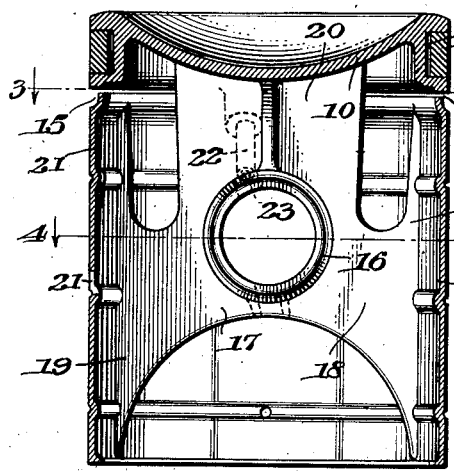
Fig. 1 is a longitudinal sectional view through a piston embodying the invention.

Referring to the drawings, 10 represents the head portion of a piston and 11 is the skirt or guide portion which is shown as separated at its periphery from the head leaving an annular slit or opening 12 therebetween. The head portion of the piston is provided with an annular groove 13 for a piston ring 14, and the upper end of the skirt portion 11 is formed with a recess shown in the form of an annular groove 15 for the purpose of collecting the oil that may be scraped from the cylinder during the reciprocation of the piston.

The piston is also provided with a pair of separated piston pin bosses 16 which are formed with integral supporting flanges 17 extending around the bosses and arranged intermediate their ends. These flanges extend laterally of their respective bosses in the form of webs 18 which integrally connect with the wall of the guide portion 11 as shown in the drawings. Since there are two of these webs or walls 18 for each of the bosses 16 there are therefore four connections of the webs 18 to the skirt or guide portion 11. These connections are in the four longitudinal lines as shown at 19.

Figure 2:
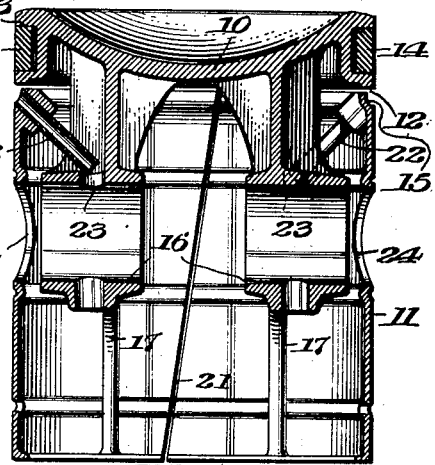
Fig. 2 is similar to Fig. 1 taken at right angles thereto, being on the line 2—2 of Fig. 3.
Figure 3:
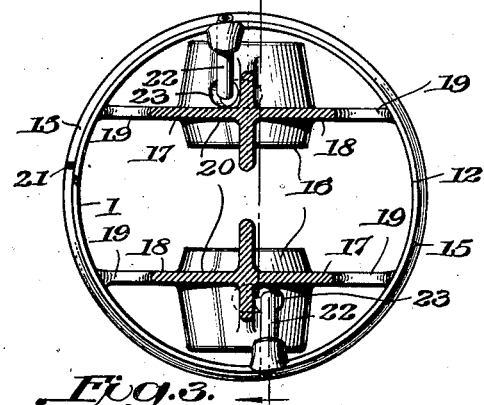
Fig. 3 is a transverse section substantially on the line 3—3 of Fig. 1.
Figure 4:
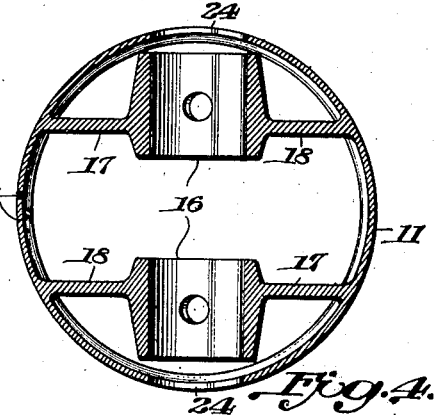
Fig. 4 is a transverse section on the line 4—4 of Fig. 1.

The flanges 17 also extend upwardly from the bosses in the form of webs or walls 20 leading to the head 10 and thereby connecting the bosses with the head. Thus, the bosses are connected to both the head and the skirt so that the latter is held in its proper position directly beneath the head as shown in Figs. 1 and 2.

In order that the skirt may not expand an undue amount when the piston is heated, as under operating conditions, the cylinder-engaging part of the guide at one side of the pin bosses which takes the angular thrust of the connecting rod during one stroke of the piston is split longitudinally as at 21. This split is slightly diagonal to prevent wearing a groove in the cylinder and it effects a complete severing of the guide wall so that the separated edges of the split are unrestrained for movement toward and from each other.

The piston is further provided with conduits 22 shown in the form of pipes extending from the recess or groove 15 at the upper end of the skirt to openings 23 in the bosses. There is shown one conduit for each boss and it will be understood that the oil collected in the groove 15 by the piston in its reciprocation is led down through the conduits 22 to the interior of the piston pin boss to thereby lubricate the bearing.

The skirt 11 is formed with openings 24 in its side registering with the openings through the bosses 16 so that the piston pin may be inserted. As these openings are well above the bottom of the guide portion of the piston the lower end of the piston skirt is left unbroken, except for the split 21, and the arcuate parts of the skirt beneath said openings may be looked upon as joining the lower ends of the diametrically opposite cylinder-engaging parts of the guide that sustain the angular thrust of the connecting rod.

It will be seen that in addition to providing a piston with a split guide portion, the above described construction also provides a longitudinally rigid connection between the piston pin bosses and the guide portion of the piston, which construction may be used either with or without the split guide portion and separated head. The arrangement of the supporting flanges 17 between the ends of the piston pin bosses and the connections of those flanges with both the piston guide portion and the head provide a particularly strong construction, and at the same time, when the longitudinal split is used, as shown, the web structure has sufficient lateral flexibility to permit the split to close more or less under the action of the expansion forces incident to the heating of the piston.

Figure 5:
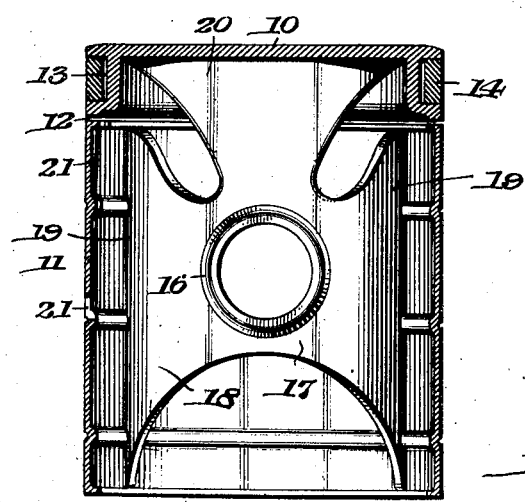
Fig. 5 is a view similar to Fig. 1, showing a slightly different form of piston embodying the invention.
Figure 6:
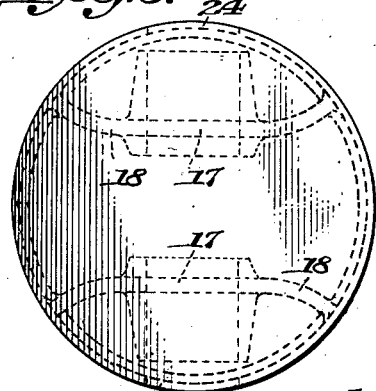
Fig. 6 is a top view of the piston shown in Fig. 5.

In Figs. 5 and 6 the webs or walls 18 are slightly curved between the flanges 17 and the guide portion to thereby distribute the connection of the bosses to the guide portion more evenly around the piston. Otherwise the showing is substantially the same as in the other figures. While my piston is, of course, adapted for use in either vertical, inclined, or horizontal engines, for convenience I refer in some instances to its head end and its open end as the upper and lower ends or parts, respectively.

It will be understood further that my invention is not limited to the details of construction shown and other forms may be used without departing from the spirit or scope of the invention.

Having thus described my invention, what I claim and desire to secure by Letters Patent is:—

1. A piston comprising a head, a skirt separated at its periphery from the head, and pin bosses connected to the head and to the upper and lower parts of the skirt, said skirt being split longitudinally at one side between its connection to said bosses.

2. A piston comprising a head, a skirt separated at its periphery from the head, and pin bosses integrally connected to the head and to the upper and lower part of the skirt, the outer ends of the pin bosses being spaced from the opposing parts of the skirt wall and said skirt having openings opposite the open ends of the bosses, said skirt being split longitudinally on one side between its connections to said bosses.

3. A piston comprising a head, a skirt separated at its periphery from the head, and pin bosses integrally connected to the head and to the skirt in four longitudinal lines, the ends of said bosses being spaced from the opposing parts of the wall of the skirt, said skirt having openings therethrough opposite the open ends of the bosses.

4. A piston comprising a head, a skirt separated at its periphery from the head, and pin bosses connected to the head, and also connected to the skirt both above and below the bosses, said skirt being split longitudinally between its connections to said bosses.

5. An integrally cast piston comprising a head, a skirt separated at its periphery from the head, and pin bosses integrally connected to the head and to the skirt at both sides and in the zone of said bosses, the bosses having their ends spaced from the opposing parts of the skirt wall, said skirt being split longitudinally between its connections to said bosses.

6. An integrally cast piston comprising a head, a skirt, separated piston pin bosses within the skirt, and an integral flange on each of said bosses intermediate its ends, said flange extending from both sides of the boss to the piston skirt and integrally united therewith in the zone of the boss, said flanges being yieldable in the direction of the piston pin boss axis and relatively rigid in the direction of their length.

7. A piston comprising a head, a skirt, separated piston pin bosses integral with the head and disposed within the skirt, and integral transversely flexible webs extending from the intermediate part of each of said bosses to the skirt wall in the zone of the boss for supporting the bosses from the adjacent part of the skirt.

8. A piston comprising a head, a skirt having its periphery separated from the head, pin bosses in the piston spaced from the wall of the skirt and conduits leading from the top of said skirt to the interior of said bosses.

9. A piston comprising a head, a skirt having its periphery separated from the head, pin bosses in the piston, the ends of said bosses being spaced from the walls of the skirt; means integrally connecting the bosses with the head and skirt, and pipes leading from the upper part of the skirt to the bosses.

10. A piston comprising a head, a skirt, separated piston pin bosses within the skirt, and an intermediate flange on each of said bosses intermediate its ends, said flange extending laterally from both sides of the boss to the piston skirt in a curve and integrally united with the skirt in the zone of the boss.

11. A piston comprising a head portion, a skirt portion, two separated pin bosses, connecting flanges in the zone of the bosses and extending from the bosses to the skirt on both sides of the bosses, connecting means from each of the bosses to the head portion, the skirt portion being entirely separated from the head portion except through the boss connections, and the skirt portion being split longitudinally of the piston to permit free expansion and contraction.

12. A piston comprising a head portion, a skirt portion, two separated pin bosses, connecting flanges in the zone of the bosses and extending from the bosses to the skirt on both sides of the bosses, connecting means from each of the bosses to the head portion, the skirt portion being entirely separated from the head portion except through the boss connections, and the skirt portion being split longitudinally of the piston to permit free expansion and contraction and the skirt portion being cut away adjacent the outer ends of the piston bosses.

13. A piston having a head portion with a ring groove therein, a skirt portion having its cylinder-engaging part separated from the head portion, separated pin bosses having integral flanges connecting them with the skirt on both sides of the bosses and with the head portion respectively, said skirt being split from top to bottom on one side only of the pin bosses to permit free expansion and contraction of the skirt portion.

14. A piston for internal combustion engines comprising in combination a head portion having an end wall and a ring-packed side wall, a guide portion having an annular bearing surface at the open end thereof and diametrically opposite cylinder-engaging parts thereof designed to take the angular thrust of a connecting rod and each separated at its upper end from the said side wall of the head portion by an unobstructed air gap, a pair of separated pin bosses disposed on an axis between said cylinder-engaging parts, a pair of longitudinally disposed walls connected to said bosses and each joined at relatively widely separated points to the said cylinder-engaging parts above and below the plane of the boss axis, said walls being disposed within the maximum diameter of the piston, and integral, rigid connections extending from the bosses to the head portion.

15. A piston for internal combustion engines comprising in combination a head portion having an end wall and a side wall, a guide portion having on one side a cylinder-engaging part disposed to take the angular thrust of a connecting rod during one stroke of the piston, said cylinder-engaging part being separated at its upper end from said side wall by an air gap and being split longitudinally to accommodate expansion incident to the heating of the piston, a pair of separated pin bosses, and walls integrally uniting said bosses, the guide portion and the head portion.

16. A piston for internal combustion engines comprising in combination a head portion having an end wall and a side wall, a guide portion having diametrically opposite cylinder-engaging parts thereof designed to take the angular thrust of a connecting rod and each separated at its upper end from the said side wall by an air gap and one of said cylinder-engaging parts being split longitudinally from its upper edge to its lower edge, a pair of separated pin bosses disposed on an axis between said cylinder-engaging parts, and walls integrally uniting said bosses, the guide portion and the head portion, said split in the cylinder-engaging face of said guide portion being disposed between the connections thereto of said walls.

17. A piston for internal combustion engines comprising in combination a head portion having an end wall and a side wall, a guide portion having diametrically opposite cylinder-engaging parts thereof designed to take the angular thrust of a connecting rod and arcuate cylinder-engaging parts joining said diemetrically opposite parts at the lower end of the guide, the said diametrically opposite parts each being separated at its upper end from the side wall of the head section by an air gap, a pair of separated pin bosses disposed on an axis between said cylinder-engaging parts, a pair of transversely flexible walls integrally connected to said bosses and integrally joined to the cylinder-engaging parts at points above and below the plane of the boss axis, said walls being disposed within the maximum diameter of the piston, and connections extending from the bosses to the head portion and integral therewith.

18. A piston for an internal combustion engine cylinder comprising in combination, a head portion having an end wall and a side wall, a guide portion having diametrically opposite cylinder-engaging parts thereof designed to receive the side thrust of a connecting rod and arcuate cylinder-engaging parts joining said diametrically opposite parts at the lower end of the guide portion to provide an annular bearing face adjacent the open end of the piston, each of said diametrically opposite cylinder-engaging parts being separated at its upper end from the side wall of the head portion, a pair of separated pin bosses disposed on an axis between said cylinder-engaging parts, a pair of spaced walls, each of which connects one of said bosses to said cylinder-engaging parts at points above and below the plane of the boss axis, one of said diametrically opposite cylinder-engaging parts being split longitudinally from its upper edge to its lower edge between its connections to said walls, and connections extending from the bosses to the head portion, whereby said piston skirt is rendered yieldable during operation in response to cylinder wall pressure.

19. A piston for internal combustion engines comprising in combination a head portion having an end wall and a side wall, a guide portion having diametrically opposite cylinder-engaging parts thereof designed to take the angular thrust of a connecting rod and each separated at its upper end from the said side wall by an air gap, a pair of separated pin bosses disposed on an axis between said cylinder-engaging parts, a pair of walls connected to said bosses and joined to the said cylinder-engaging parts at points above and below the plane of the boss axis, and rigid, integral connections between the bosses and the head portion comprising upward extensions of said walls with strengthening ribs disposed substantially at right angles thereto.

20. A piston for internal combustion engines comprising in combination a head portion having an end wall and a side wall, a guide portion having diametrically opposite cylinder-engaging parts thereof designed to take the angular thrust of a connecting rod and each separated at its upper end from the said side wall by an air gap, spaced supporting connections between said head and guide portions, one of said cylinder-engaging parts being split longitudinally from its upper edge to its lower edge between said supporting connections, a pair of separated pin bosses disposed on an axis between said cylinder-engaging parts, a pair of walls disposed within the maximum diameter of the piston and integrally connected to said bosses and to said cylinder-engaging parts and to said head portion.

21. A piston for internal combustion engines comprising in combination a head portion having an end wall and a side wall, a guide portion having diametrically opposite cylinder-engaging parts thereof designed to take the angular thrust of a connecting rod and each separated at its upper end from the said wall by an air gap and one of said cylinder-engaging parts being split longitudinally from its upper edge to its lower edge, a pair of separated pin bosses disposed on an axis between said cylinder-engaging parts, and walls integrally uniting said bosses, the guide portion and the head portion, the guide structure and said walls being adapted to permit the split of the cylinder-engaging part to close more or less under the action of forces incident to the heating of the piston during operation.

22. A piston comprising in combination a head portion having an end wall and side wall, a guide portion having diametrically opposite cylinder-engaging parts thereof designed to take the angular thrust of a connecting rod and each separated at its upper end from the said side wall by an air gap, a pair of separated pin bosses disposed on an axis between said cylinder-engaging parts, a pair of walls connected to said bosses and to said cylinder-engaging parts, and connections extending from the bosses to the head section, one of the said cylinder-engaging parts being split longitudinally between the points of attachment thereto of the said walls.

23. In a piston, the combination of a head portion having an end wall and a side wall, a guide portion, a pair of separated piston pin bosses connected to the head portion, and webs disposed longitudinally of the piston integrally joining the inner parts of said bosses to the guide portion in the zone of said bosses.

24. A piston for internal combustion engines comprising a head portion, a guide portion, a pair of separated pin bosses connected to the head portion and arranged within the maximum diameter of the piston whereby the outer ends of the bosses will be out of contact with the cylinder wall, and a flange on each of said bosses near its inner end extending laterally from both sides of the boss to the guide portion in a curve and integrally united with the guide portion in the zone of the boss, said flange being disposed longitudinally of the piston.

25. An integrally formed piston for internal combustion engines comprising in combination a head portion having an end wall and a side wall, a pair of separated pin bosses, and a guide portion connected to said bosses and having on one side a cylinder-engaging part disposed to take the angular thrust of a connecting rod during one stroke of the piston, said cylinder-engaging part being separated at its upper end from said side wall of the head portion by an air gap and being split longitudinally between its connections to said bosses to accommodate expansion incident to the heating of the piston.

26. An integrally formed piston for internal combustion engines comprising in combination a head portion having an end wall and a side wall, a guide portion having diametrically opposite cylinder-engaging parts thereof designed to take the angular thrust of a connecting rod and each separated at its upper end from the said side wall by an air gap, spaced supporting connections between said head and guide portions, one of said cylinder-engaging parts being split longitudinally between its supporting connections from its upper edge to its lower edge, and a pair of separated pin bosses disposed on an axis between said cylinder-engaging parts.

27. A one-piece piston with a solid end portion and a skirt portion supported therefrom by spaced integral connections and having formed in its peripheral face a transverse slot adjacent the solid end of the piston and a single longitudinal slot in the skirt between the spaced integral connections and extending from the transverse slot to the open end of the piston, said slots forming adjacent disconnected main peripheral bearing portions in the skirt which are capable of unrestrained outward and inward movement, the bearing face of said piston diametrically opposite said longitudinal slot being circumferentially continuous between the spaced integral connections of the skirt to the head on that side of the skirt.

28. A one piece piston provided with a solid end portion and a skirt portion having oppositely disposed thrust bearing faces, said skirt portion having a longitudinally extending slot formed through the thickness of its wall, said slot extending from the rear edge of the skirt portion through one of said thrust bearing faces and forming adjacent disconnected parts of a thrust bearing face in said skirt portion which are capable of being moved inwardly or outwardly without restraint.

29. A piston comprising a head and body, internal yielding ribs supporting the head and body, and means on said ribs adapted to form engaging connection with operable parts for said piston.

30. A piston open at one end and having a packing ring supporting portion and a cylinder engaging portion, said cylinder engaging portion having a slot which is cut through the thickness of its peripheral wall and extending from the open end of the piston to said ring supporting portion, a pair of wrist pin bearings depended from said ring supporting portion separating from said cylinder engaging portion, and tying means extending from each of said wrist pin bearings each being co-operably connected at their opposite ends to said cylinder engaging portion.

31. A piston having a head with top and side walls in combination with a guide structure connected thereto and comprising diametrically opposite cylinder-engaging parts formed with air spaces between their upper edges and the bottom edge of the side wall of the head, wrist pin bosses between the cylinder-engaging parts, and means joining said bosses and cylinder-engaging parts together, the said joining means being resiliently yieldable and arranged not to engage the cylinder.

32. A piston closed at one end and open at its opposite end, said piston having an annular cutting formed through the thickness of its peripheral wall thereby providing a separated sleeve-like skirt which is approximately cylinder bearing in its entirety, a pair of wrist pin bearings depended from said piston end and being free from engagement with said skirt, supporting means extending from each of said bearings to said skirt, said skirt being provided with a longitudinal slot cut through the thickness of its wall between its connections to said supporting means and extending from the open end thereof to said annular cutting.

33. A piston for use in an engine cylinder comprising a head, a skirt, parts of said skirt forming oppositely positioned main bearing portions designed to take the side thrust of a connecting rod, a pair of spaced wrist pin bosses, means integrally connecting the bosses to the head, and means integrally connecting each boss to both of said opposite main bearing portions, one main bearing portion being circumferentially continuous between its connections to the bosses and the other main bearing portion being separated from the head and slit longitudinally between its connections to the bosses to render said slit main bearing portion yieldable in response to pressure from the engine cylinder during operation.

34. A piston for use in an engine cylinder comprising a head, a skirt, parts of said skirt forming oppositely positioned main bearing portions to take the side thrust of a connecting rod, a pair of spaced wrist pin bosses, means integrally connecting the bosses to the head, and means integrally connecting each boss to both of said opposite main bearing portions, one main bearing portion being circumferentially continuous between its connections to the bosses and the other main bearing portion being separated from the head and slit longitudinally its entire length between its connections to the bosses to render said slit main bearing portion yieldable in response to pressure from the engine cylinder during operation.

35. A single-piece, integral piston, comprising a head, a pair of spaced wrist pin bosses having a common axis, a skirt, and means yieldingly connecting the skirt to the head, said skirt being integral and having main cylinder bearing faces disposed on opposite sides of the axis of said wrist pin bosses, said skirt being separated from the head at the upper end of each of said bearing faces, one only of said main cylinder bearing faces being slit longitudinally between its connections to the head, whereby said head may expand and contract during operation of said piston substantially independently of said skirt portion when expansion of the skirt portion is restrained.

36. A single-piece, integrally cast piston for use in an engine, comprising a head, wrist pin bosses having a common axis, a skirt, and means connecting said head and bosses and skirt together, said skirt being integral and having a main bearing portion disposed on each side of the said wrist pin boss axis and designed to take the side thrust produced by the angularity of the connecting rod of the engine, said piston having a transverse slit through its wall on one side of the boss axis, portions of said skirt on the transversely slit side of the piston also being slit longitudinally between its connections to said bosses to provide a peripheral main bearing portion in the said transversely slit side of said piston that is capable of yielding in response to pressure from the engine cylinder during operation of the piston.

37. A single-piece, integral piston for operation in an internal combustion engine cylinder, comprising a head, spaced wrist pin bosses, a longitudinally slitted one piece skirt that is yieldable in response to cylinder wall pressure having cylinder-engaging faces disposed at opposite sides of the axis of said bosses and designed to yieldingly engage the walls of the cylinder during operation, said head and skirt being separated at the upper end of each of said cylinder-engaging faces, and means yieldingly connecting the skirt to said head including means connecting the bosses and the skirt, said means connecting said bosses and said skirt being substantially rigid in the direction transverse to the axis of the bosses, whereby said head portion may expand and contract during operation of said piston without binding engagement of the skirt with the walls of the cylinder.

38. A single-piece, integrally cast piston for use in an engine, comprising a head, wrist pin bosses having a common axis, a skirt, and means connecting said head and bosses and skirt together, said skirt being integral and having a main bearing portion disposed on each side of the said wrist pin boss axis and designed to take the side thrust produced by the angularity of the connecting rod of the engine, said piston having a transverse slit through its wall on both sides of the boss axis, one only of said main bearing portions being slit longitudinally between its connections to said bosses to provide a peripheral bearing portion therein that is capable of yielding outward and inward movement relative to the head during operation of the piston.

39. A piston for an engine cylinder comprising a skirt, a head separated from the skirt wall around its entire periphery, said skirt being longitudinally slit to render the skirt wall yieldable on every diameter in response to cylinder wall pressure, wrist pin bosses, and means rigidly connecting said bosses to the head and yieldingly connecting said bosses to the skirt whereby said skirt is yieldable in response to cylinder wall pressure.

40. A piston for an engine cylinder comprising a cylindrical skirt that is longitudinally slit and yieldable on every diameter in response to cylinder wall pressure, a pair of wrist pin bosses having a common axis, said skirt being integral and having a main cylinder bearing portion on each side of the axis of said wrist pin bosses, a head peripherally separated from at least one of said main cylinder-bearing portions, and means connecting the bosses with the skirt, said means being yieldable in the direction of the boss axis and substantially rigid in the direction transverse to said axis, whereby said head may freely expand and contract during operation of the piston when expansion of the skirt is restrained.

41. A piston comprising a head, a pair of spaced wrist pin bosses rigidly carried by the head and having a common axis, a skirt that is separated from the head on each side of the wrist pin bosses and longitudinally slit between the bosses on one side only of the bosses to render the skirt circumferentially yielding on that side of said bosses and circumferentially non-yielding on the opposite side of said bosses, and means substantially non-yielding in the direction transverse to the boss axis connecting the bosses with the skirt.

42. A piston for an engine cylinder comprising, a head, and an integral guide portion having diametrically opposite cylinder-engaging parts thereof designed to receive the thrust of a connecting rod during operation, one of said cylinder-engaging parts being rigidly connected to the head in the direction of load thrust from the connecting rod, the opposite cylinder-engaging part being yieldable relative to the head in response to cylinder wall pressure, whereby thermal expansion of said piston will not cause it to seize in the cylinder during operation.

43. A piston for an internal combustion engine cylinder, comprising a head portion carrying packing means and an integral guide portion integral with the head portion and having diametrically opposite cylinder-engaging parts thereof designed to receive side thrust from a connecting rod, one of said cylinder-engaging parts being slit longitudinally to render it materially more yielding than the opposite cylinder-engaging part.

In testimony whereof I affix my signature.

EDWARD J. GULICK.

CERTIFICATE OF CORRECTION.

Patent No. 1,815,733. Granted July 21, 1931, to

EDWARD J. GULICK.

It is hereby certified that error appears in the printed specification of the above numbered patent requiring correction as follows: Page 5, line 33, claim 30, for the word "separating" read and separated; and that the said Letters Patent should be read with this correction therein that the same may conform to the record of the case in the Patent Office.

Signed and sealed this 22nd day of September, A. D. 1931.

(Seal)

M. J. Moore,
Acting Commissioner of Patents.

DISCLAIMER 1,815,733.—*Edward J. Gulick*, Elkhart, Ind. PISTON. Patent dated July 21, 1931. Disclaimer filed December 31, 1938, by the assignee, *The Cleveland Trust Company*.

Hereby enters this disclaimer to claims 6, 7, 17, 29, 31, 35, 37, 39, and 40 of said patent.

[*Official Gazette January 24, 1939.*]